United States Patent
Liu et al.

(10) Patent No.: US 8,953,612 B2
(45) Date of Patent: Feb. 10, 2015

(54) EFFICIENT BROADCASTING VIA RANDOM LINEAR PACKET COMBINING

(75) Inventors: Hui Liu, Clyde Hill, WA (US); Mohammad H. Firooz, San Jose, CA (US); Sumit Roy, Bothell, WA (US)

(73) Assignee: CMMB Vision USA Inc, Central Hong Kong (HK)

( * ) Notice: Subject to any disclaimer, the term of this patent is extended or adjusted under 35 U.S.C. 154(b) by 168 days.

(21) Appl. No.: 13/414,235

(22) Filed: Mar. 7, 2012

(65) Prior Publication Data
US 2013/0235794 A1 Sep. 12, 2013

(51) Int. Cl.
H04L 12/28 (2006.01)
H04L 1/00 (2006.01)
H04H 20/42 (2008.01)

(52) U.S. Cl.
CPC ............ *H04L 1/0076* (2013.01); *H04H 20/42* (2013.01)
USPC ............................ 370/394; 370/473; 370/474

(58) Field of Classification Search
None
See application file for complete search history.

(56) References Cited

U.S. PATENT DOCUMENTS

| | | | |
|---|---|---|---|
| 769,088 A * | 8/1904 | Jacobs .............................. | 417/35 |
| 6,757,654 B1 * | 6/2004 | Westerlund et al. ........... | 704/262 |
| 6,769,086 B2 | 7/2004 | Western | |
| 7,343,539 B2 * | 3/2008 | Divsalar et al. ................ | 714/755 |
| 7,349,813 B2 * | 3/2008 | Gutierrez et al. ............... | 702/46 |
| 7,408,938 B1 * | 8/2008 | Chou et al. ..................... | 370/394 |
| 7,706,365 B2 * | 4/2010 | Effros et al. ................... | 370/389 |
| 8,516,323 B2 * | 8/2013 | Raith et al. ..................... | 714/748 |
| 8,571,214 B2 * | 10/2013 | Lima et al. ..................... | 380/212 |
| 2001/0004761 A1 * | 6/2001 | Zehavi ............................ | 714/784 |
| 2002/0026253 A1 * | 2/2002 | Rajan ................................ | 700/94 |
| 2002/0164046 A1 * | 11/2002 | Walker et al. .................. | 382/100 |
| 2003/0086366 A1 * | 5/2003 | Branlund et al. .............. | 370/208 |
| 2003/0177429 A1 * | 9/2003 | Hessel et al. ................... | 714/751 |
| 2005/0005189 A1 * | 1/2005 | Khermosh et al. ................ | 714/4 |
| 2005/0190762 A1 * | 9/2005 | Kobayashi ..................... | 370/389 |
| 2005/0204242 A1 * | 9/2005 | Chou et al. ..................... | 714/741 |
| 2005/0246417 A1 * | 11/2005 | Raith et al. ..................... | 709/203 |
| 2005/0249211 A1 * | 11/2005 | Chou et al. ..................... | 370/389 |
| 2006/0294445 A1 * | 12/2006 | Divsalar et al. ............... | 714/752 |
| 2007/0171941 A1 * | 7/2007 | Lee et al. ........................ | 370/485 |
| 2007/0195894 A1 * | 8/2007 | Shokrollahi et al. .......... | 375/242 |
| 2007/0271044 A1 * | 11/2007 | Gutierrez et al. ............... | 702/45 |
| 2008/0022182 A1 * | 1/2008 | Katayama et al. ............. | 714/752 |

(Continued)

OTHER PUBLICATIONS

International Search Report and Written Opinion issued for PCT/US2013/029310, dated May 7, 2013, 8 pages.

(Continued)

*Primary Examiner* — Ayaz Sheikh
*Assistant Examiner* — Faiyazkhan Ghafoerkhan

(57) ABSTRACT

Embodiments of systems and methods for efficient broadcasting via random linear packet combining are described. A plurality of data packets are received from a data source according to embodiments. The plurality of data packets is divided into a plurality of data blocks, and bits associated with the plurality of data blocks are multiplied by a set of coefficients to generate a plurality of product values. An encoded data packet having a plurality of encoded data blocks may also be generated by linearly combining the plurality of product values for respective data blocks of each of the plurality of data packets into corresponding encoded data blocks of the encoded data packet. Because each encoded data packet includes information about a complete set of data packets, rather than just a subset, less broadcast redundancy may be required.

21 Claims, 12 Drawing Sheets

(56) References Cited

U.S. PATENT DOCUMENTS

| | | | |
|---|---|---|---|
| 2008/0181170 A1* | 7/2008 | Branlund et al. | 370/328 |
| 2008/0291834 A1* | 11/2008 | Chou et al. | 370/238 |
| 2009/0279688 A1* | 11/2009 | Michaels et al. | 380/28 |
| 2010/0157904 A1* | 6/2010 | Ho et al. | 370/328 |
| 2010/0227631 A1* | 9/2010 | Bolton et al. | 455/466 |
| 2010/0281338 A1* | 11/2010 | Liu | 714/758 |
| 2010/0299699 A1* | 11/2010 | Citta et al. | 725/32 |
| 2011/0041041 A1* | 2/2011 | Kim | 714/780 |
| 2011/0258510 A1* | 10/2011 | Watson et al. | 714/752 |
| 2013/0229485 A1* | 9/2013 | Rusanovskyy et al. | 348/43 |

OTHER PUBLICATIONS

Michael Luby, "LT Codes", Digital Fountain, Inc., Proceedings of the 43rd Annual IEEE Symposium on Foundations of Computer Science (FOCS'02), 10 pages.

Amin Shokrollahi, Senior Member, IEEE, "Raptor Codes", IEEE Transactions on Information Theory, vol. 52. No. 6, Jun. 2006, pp. 2551-2567.

Petar Maymounkov, TR2002-833, "Online Codes (Extended Abstract)", Secure Computer Systems Group, New York University, full-time PhD candidate, 715 Broadway, Room 715, New York, NY 10003, pp. 1-15.

* cited by examiner

EFFICIENT BROADCASTING VIA RANDOM LINEAR PACKET COMBINING

TECHNICAL FIELD

This invention relates to data communications and more particularly relates to efficient broadcasting via random linear packet combining.

BACKGROUND OF THE INVENTION

In a broadcast network, a broadcast base station ("base station") or set of base stations transmit the same data to a large number of network participants. Such systems are often configured for unidirectional communications, meaning that the base station transmits the data to the participates, but typically does not receive any responsive communication. Indeed, one advantage of broadcast networks is that the hardware and software required to operate the system may be simplified as compared with bi-directional communication systems because a typical unidirectional base station only requires transmit path hardware. A further advantage of broadcast networks over bi-directional communication networks is that network resources, such as communication bandwidth, may be conserved because the entire band may be used for communication in a single direction without the need to reserve bandwidth for responsive communications. An additional benefit is that network performance and download speeds may be improved over bi-directional communication networks because there is typically no need to wait for acknowledgements and responsive communications between the parties.

Despite these advantages, there have traditionally been some disadvantages of broadcast networks. One such disadvantage is that a network participant which is outside of a particular geographical area often do not receive complete data sets, or may receive errors in the received data. Other circumstances may affect reception, including motion, multipath fading, physical signal obstructions and the like. If the network traffic is simply blasted out to the network participants without any regard for whether the participants are receiving complete data, network performance may be poor.

One solution to the problem of lost or erroneous data in broadcast networks is to provide feedback between the network participants and the base station. For example, the participants can be configured to provide an acknowledgement signal to the base station, and the base station may be configured to receive the acknowledgment signal. As described above, this solution is not preferable in some situations (e.g., where a large amount of data is being transmitted to a number of network participants), because added hardware and network delays are required. For example, an entire broadcast network may be stalled while the base station waits for a single network participant to provide an acknowledgement within a specified time-out period. An additional problem is that in networks where there are a large number of users, there may correspondingly be a larger number of acknowledgment signals communicated, which may waste valuable network bandwidth, yet large enough to provide sufficient redundancy for the worst case receiver.

Another approach to the problem of lost or erroneous data in broadcast networks is to simply do nothing. In other words, the base station simply broadcasts the packets without feedback or any other form of quality of signal assurance, and just live with a reduced broadcast range, temporary loss of reception, or reduction of reception quality. One problem with this approach is that a network participant may include a mobile communication device. Thus, the network participant may move in and out of the broadcast range. It can become frustrating to a user when attempting to download a large file, such as a media file, if the download is continually interrupted midway through the download because the network participant moves out of the broadcast range, receive interference, or move to a position where one or more physical obstructions may limit reception quality. Thus, this approach is not optimal.

Still another approach to resolving the broadcast data loss problem is Fountain Coding. This approach involves encoding packets at the base station such that the data is redundant, whereby missing packets can be recovered. In fountain coding, a source file containing N packets of data is encoded into Z packets and transmitted without any feedback from the receiver. In such systems, the difference between the total number of transmitted packets and the number of original packets can be represented as E. When a receiver has received a specific number of encoded packets (N'), the original packets (N) can be decoded within a certain probability. N' can be defined as shown in equation 1:

$$N'=N+E \tag{1}$$

Here, the number of additional packets (E) can be determined based upon a variety of signal factors including channel conditions, including range of the channel, electronic interference, topology interference, and the like. The probability that all N packets can be properly decoded once N' encoded packets have been received can be expressed as $1-d(E)$. This probability defines the quality of service (QoS) of the broadcast system. The more extra transmitted packets, the higher the probability of accurately decoding the data is. In general, however, it is desirable to design a system such that E is as small as possible, in order to make efficient use of network bandwidth, yet large enough to provide sufficient redundancy for the worst case receiver. Additional redundancy may be required for coding algorithms that require a particular sequence of data packets for decoding.

There are two primary versions of fountain codes: LT codes and raptor codes. In these coding techniques, the packets are encoded using an XOR operation. The resulting probability of decoding the full file is $d(E) \leq 2^{-E}$. This probability is not optimal for efficient network performance. In addition, with these systems, the receivers must have a priori knowledge of the encoding algorithm used at the base station, which may require additional communications and further reduce network efficiency and increase network complexity.

BRIEF SUMMARY OF THE INVENTION

Embodiments of systems and methods for efficient broadcasting via random linear packet combining are described. In such embodiments, information about an entire data set to be broadcast may be included in each encoded data packet. Since each data packet includes information about the entire data set, fewer redundant data packets may be required to transmit a data file than with convention methods. For example, in such an embodiment, there is no particular sequence of packets required. Thus, with the described embodiments, a receiver may decode a data set broadcast by a transmitter once a threshold number of packets is received. There is no requirement to receive any particular sequence of encoded data packets. Additionally, since each encoded data packet contains information needed to decode the entire data set, there is no need to have a priori knowledge of the encoding algorithm.

In one embodiment, a method for random linear packet combining includes receiving a plurality of data packets from a data source. Additionally, the method may include dividing the plurality of data packets into a plurality of data blocks, and multiplying bits associated with the plurality of data blocks by a set of coefficients to generate a plurality of product values. The method may also include generating an encoded data packet having a plurality of encoded data blocks, wherein generating the encoded data packet comprises linearly combining the plurality of product values for respective data blocks of each of the plurality of data packets into corresponding encoded data blocks of the encoded data packet. Because each encoded data packet includes information about a complete set of data packets, rather than just a subset, less broadcast redundancy may be required. Beneficially, because the described embodiments use a linear combination, the decoder and receiver may be relatively simple and fast. Therefore, one advantage of the present embodiments is that cost and complexity of the receiver may be the same or lower than those of the prior art.

In an embodiment, each encoded data packet includes a header field. In one embodiment, the size of the header may be negligible when compared with the data packet size. Thus, adding the header would not significantly impact system overhead. The header field may contain the set of coefficients and a value indicating a length of each data block. With the information provided in the header field, each broadcast network participant is able to decode the encoded data packet without any a priori knowledge of the encoding scheme employed. Thus, the encoding parameters may be adjusted on the fly, without the need of informing each network participant in an out-of-band communication.

The coefficients may be random numbers. In one embodiment, a different coefficient may be multiplied with each block in the data packets. In a further embodiment, the random numbers may be selected from a finite field of random numbers. In a particular embodiment, the coefficients may be selected from a Galois Field. By restricting the field of available random numbers, the decoding process may be further simplified, requiring even less transmission redundancy.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
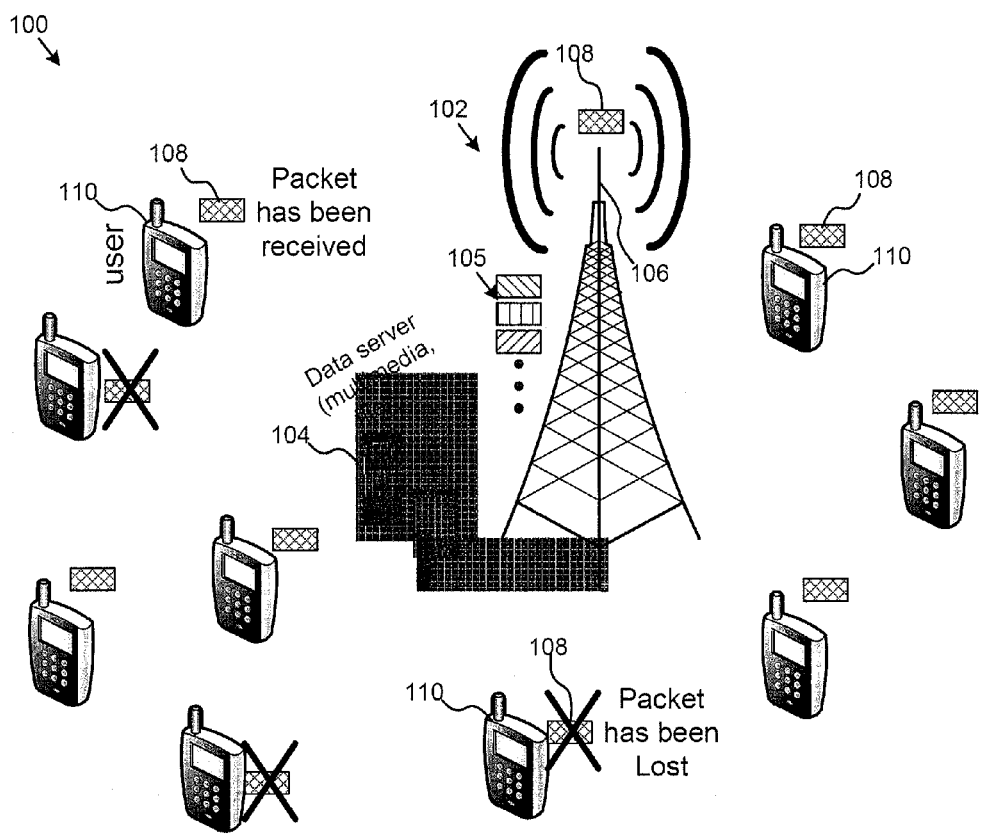
FIG. 1 is a schematic diagram illustrating one embodiment of a system for efficient broadcasting via random linear packet combining.

FIG. 1 is a schematic diagram illustrating one embodiment of system 100 for efficient broadcasting via random linear packet combining. System 100 may include base station 102 configured to broadcast data to broadcast network participants 110. In one embodiment, base station 102 may include data server 104 configured to store and provide data to network participants 110. In addition, base station 102 may include broadcast antenna 106. In various embodiments, base station 102 also may include baseband equipment, RF equipment, and additional equipment for data coding as described herein.

Base station 102 may convert one or more data packets 105 into encoded data packets 108 using random linear packet combining in accordance with embodiments of the invention. Base station 102 may then broadcast encoded data packets 108 to one or more broadcast network participants 110 located within a broadcast area. As illustrated, many of the broadcast network participants may receive the encoded data packets, but occasionally a network participant 110 may lose encoded data packet 108 as illustrated by the encoded data packets 108 with the large 'X's. Those broadcast network participants 110 that receive encoded data packet 108 may decode data packet 108 and extract original data packets 105. Those network participants 110 that lose encoded data packet 108, but have received at least a minimum number of encoded data packets 108 may deduce data packets 105 contained in the lost encoded data packet 108 from coding information contained in the other encoded data packets 108 which were received. Thus, broadcast network participants 110 may obtain the complete set of data packets 105, even if one or more of encoded data packets 108 are lost.

Figure 2:
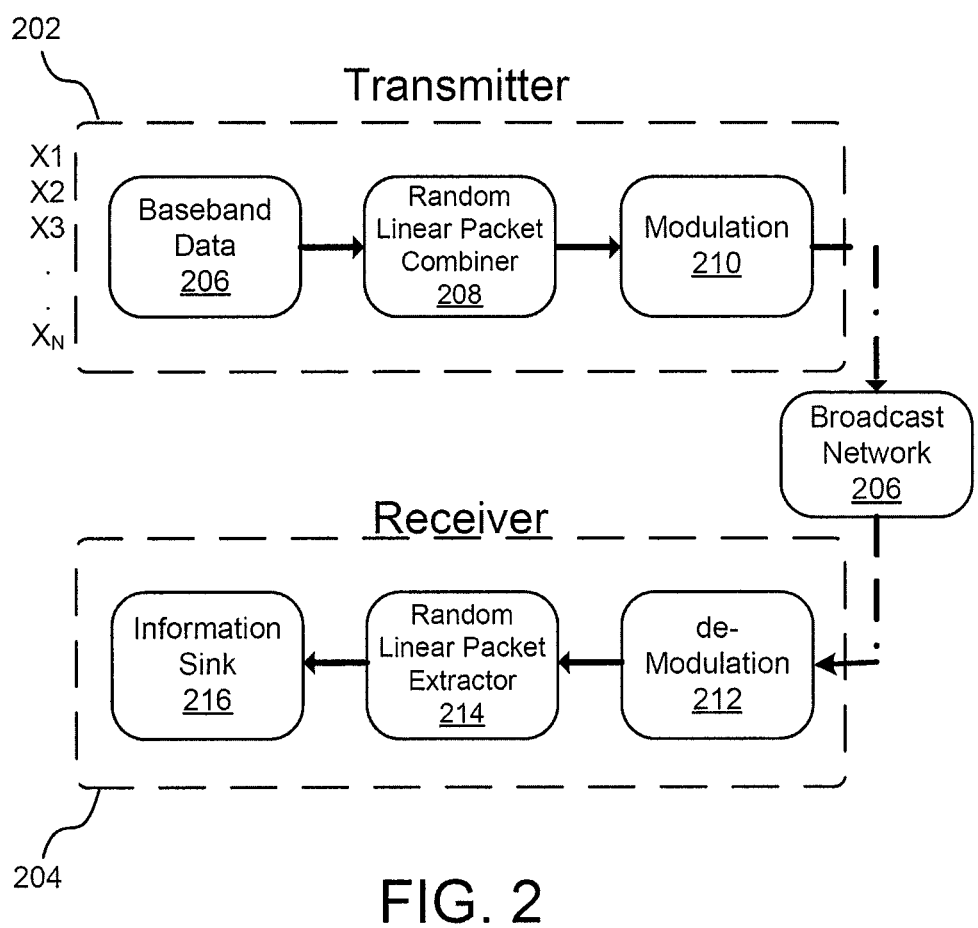
FIG. 2 is a schematic block diagram illustrating modules comprising components in an embodiment of a system for efficient broadcasting via random linear packet combining.

FIG. 2 is a schematic block diagram illustrating modules comprising components in an embodiment of system 100 for efficient broadcasting via random linear packet combining. In one embodiment, base station 102 may include transmitter 202. Additionally, each broadcast network participant 110 may include receiver 204. Transmitter 202 may communicate data to receiver 204 via broadcast network 206.

In one embodiment, transmitter 202 may include baseband data module 206, random linear packet combiner 208, and modulation module 210 operable cooperatively to provide random linear packet combining according to the concept of the present invention. Baseband data module 206 may include network interface components configured to receive data packets from a local area network, a wide area network, or the Internet. In another embodiment, baseband data module 206 may communicate with data storage server 104 or other data network. Baseband data module 206 may packetize data comprising a data file. Baseband data module 206 may then communicate data packets 105 to random linear packet combiner 208.

Random linear packet combiner 208 may be configured to perform the random linear packet combining process described in further detail with reference to FIGS. 3 and 4. Random linear packet combiner 208 may generate encoded data packets 108 from data packets 105. In one embodiment each encoded data packet 108 may contain information about an entire set of data packets 105 corresponding to a specific data file, streaming media flow, or other data construct as illustrated further in FIG. 4. Random linear packet combiner 208 may then communicate encoded data packets 108 to modulation module 210.

Modulation module 210 may then modulate encoded data packets onto a carrier wave for transmission by a broadcast antenna (not shown) over broadcast network 206. In one embodiment, a selected number of encoded data packets 108 may be generated by random linear packet combiner 208 and modulated onto a carrier wave for broadcast transmission over broadcast network 206. The selected number may be selected to give the redundancy desired for communication channel. Each encoded data packet 108 include information about a complete data set or group of data packets 105 corresponding to a file according to embodiments of the invention. The number of encoded data packets 108 transmitted may determine a broadcast coverage range and probability of accurate decoding of data packets 105. For example, the higher the redundancy, the further a network participant 110 may travel from the base station 102 and still receive enough data packets to accurately decode the data file.

Receiver 204 may include demodulation module 212, random linear packet extractor 214, and information sink 216. Once encoded data packets 108 are received through broadcast network 206 by receiver 204, demodulation module 212 may demodulate a received RF broadcast signal and extract encoded data packets 108. Encoded data packets 108 may then be passed to random linear packet extractor 214. Once a sufficient number of encoded packets data 108 are received, random linear packet extractor 214 may decode encoded data packets 108 and extract data packets 105. In one embodiment, random linear packet extractor 214 may reconstruct a complete data file. Alternatively, random linear packet extractor 214 may send data packets 105 to information sink 216, where a complete data file may be reconstructed.

Figure 3:
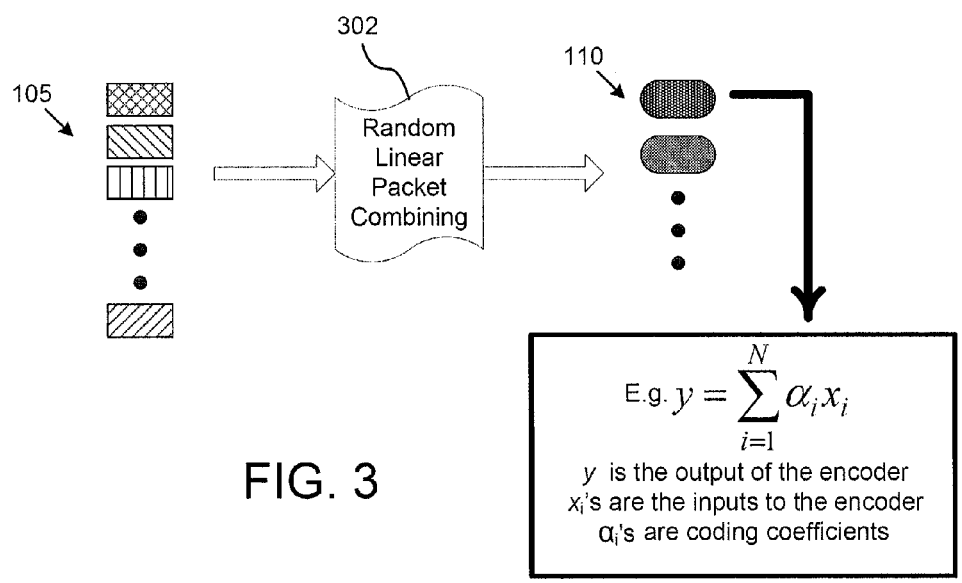
FIG. 3 is a logical diagram illustrating an embodiment of a method for efficient broadcasting via random linear packet combining.

FIG. 3 is a logical diagram illustrating an embodiment of a method for efficient broadcasting via random linear packet combining. This method may be performed by random linear packet combiner 208. In one embodiment, random linear packet combining 302, as performed by transmitter 202 in one embodiment, may be performed on data packets 105 to generate encoded packets 108. Further embodiments of random linear packet combining 302 are described below with reference to FIG. 4. In a particular embodiment, the process for generating encoded packets 108 may be characterized by the equation:

$$y = \sum_{i=1}^{N} a_i x_i \quad (2)$$

where y represents the output of random linear packet combiner 208, $x_i$ represents an input received by random linear packet combiner 208, $a_i$ represents the coding coefficient, for each of the for each received input $x_i$ up to N total received inputs. In one embodiment, each input x may be a data packet 105, and each of encoded data packets 108 may include information about an entire set of data packets 105 as illustrated below with reference to FIG. 4. To perform the summation operation, each input $x_i$ may be dived into q-bit blocks and those block may be added together.

Figure 4A:
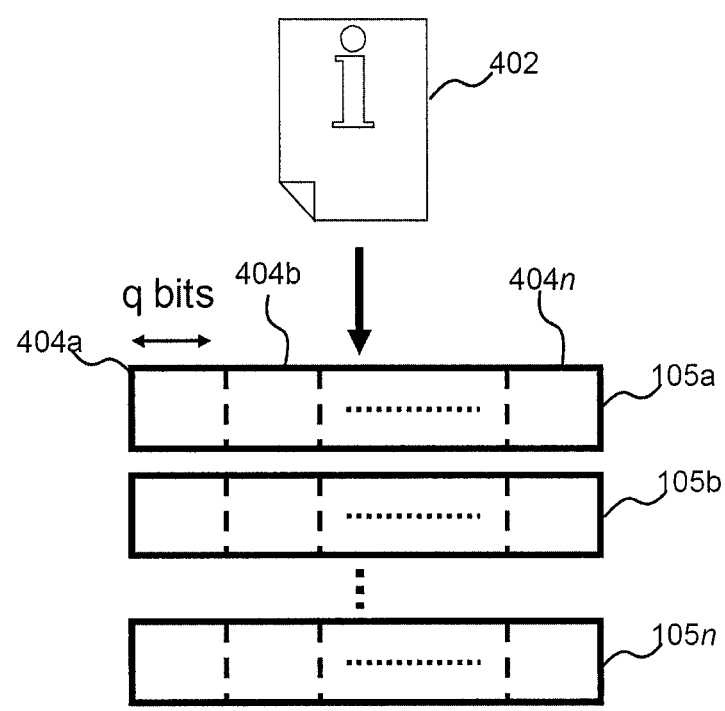
FIGS. 4A-4E are logical diagrams illustrating embodiments of a method for efficient broadcasting via random linear packet combining.

FIGS. 4A-4E are logical diagrams illustrating and embodiment of a method for efficient broadcasting via random linear packet combining. FIG. 4A illustrates how data file 402 may be divided into multiple data packets 105a-n. Data packets 105a-n may include non-overlapping portions of the data comprising the data file. As illustrated, each data packet 105a-n may be further divided into multiple blocks 404a-n. Each block 404a-n may contain a predetermined number of bits (q bits per block).

Figure 4B:
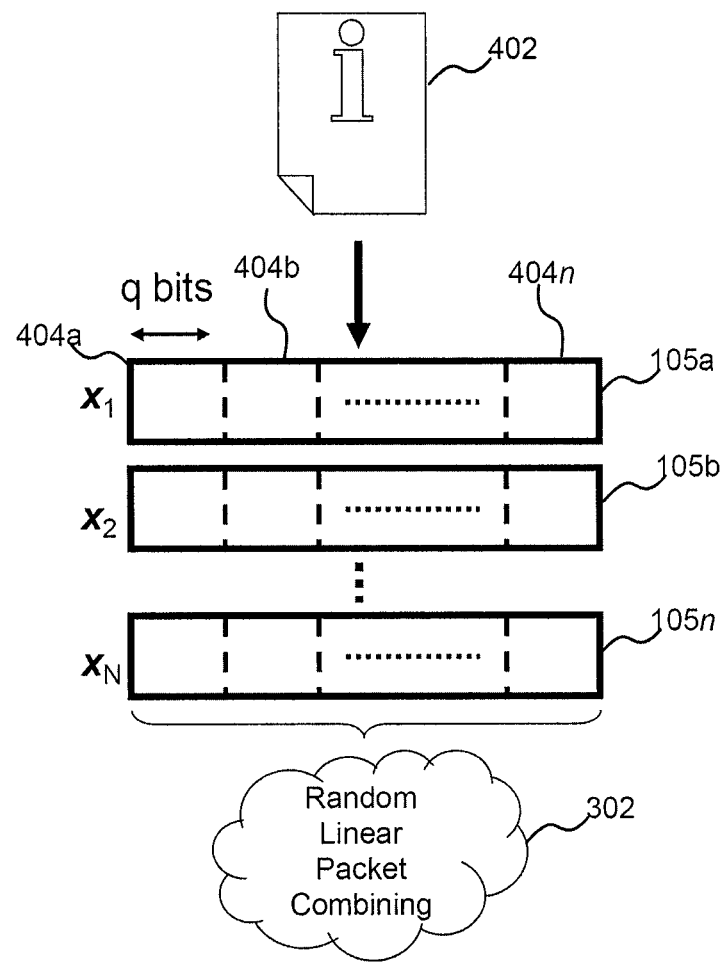
Figure 4C:
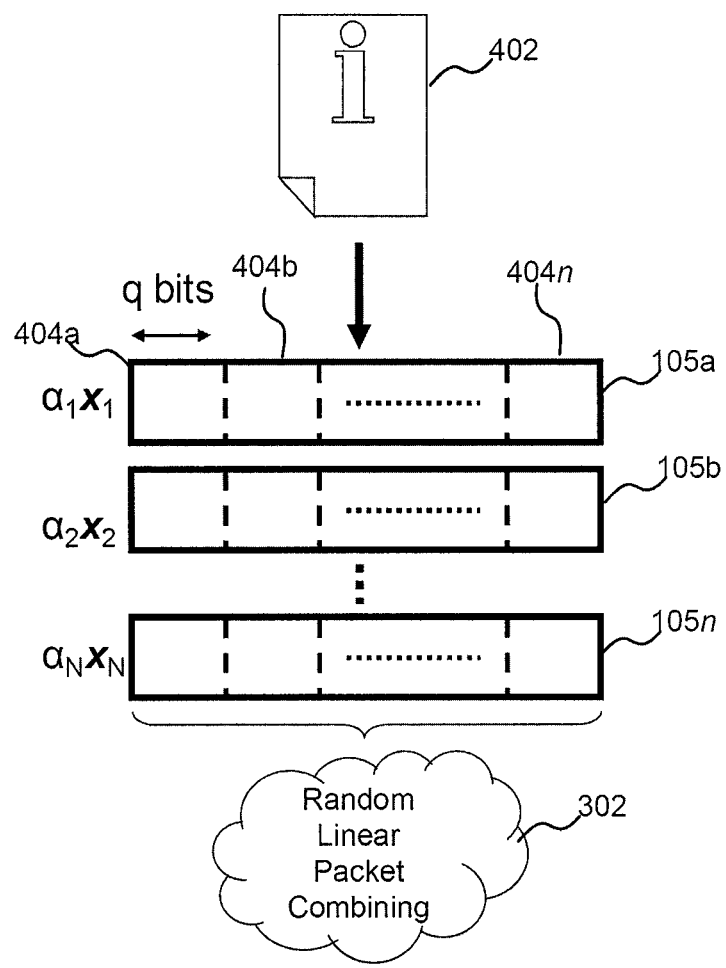
Figure 4D:
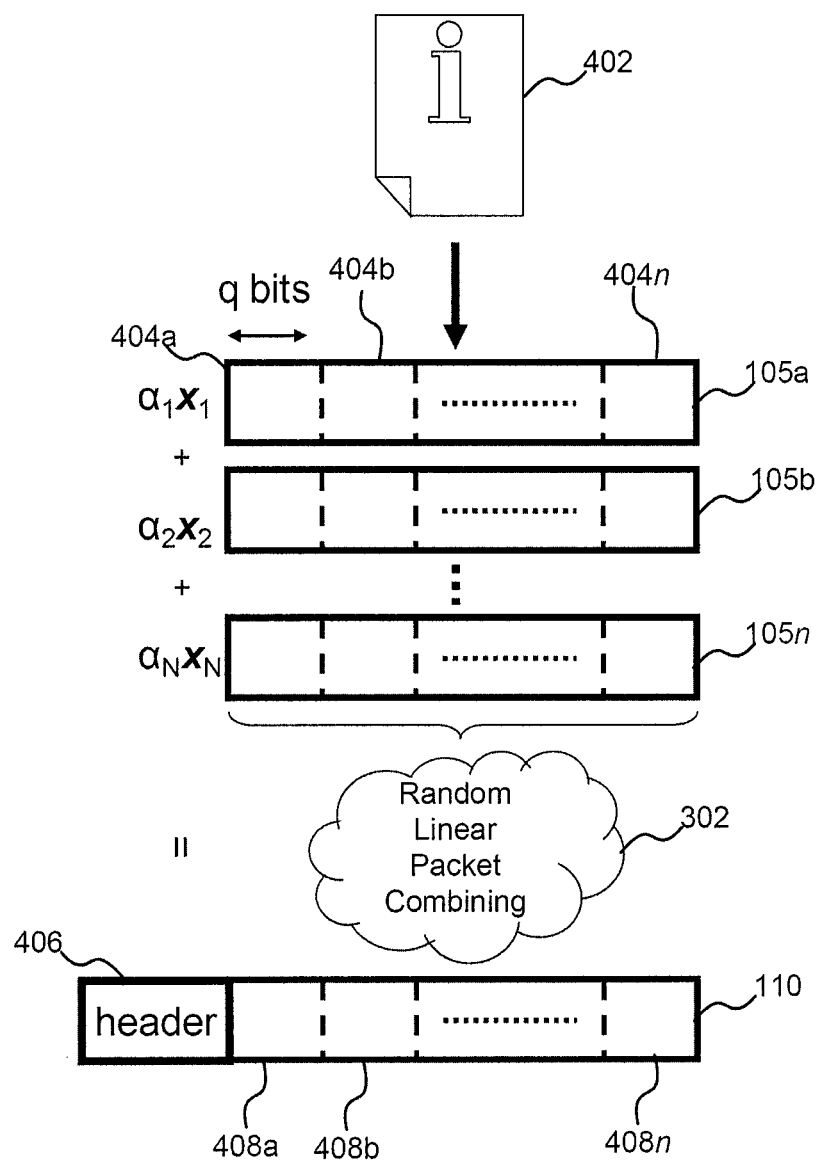
Figure 4E:
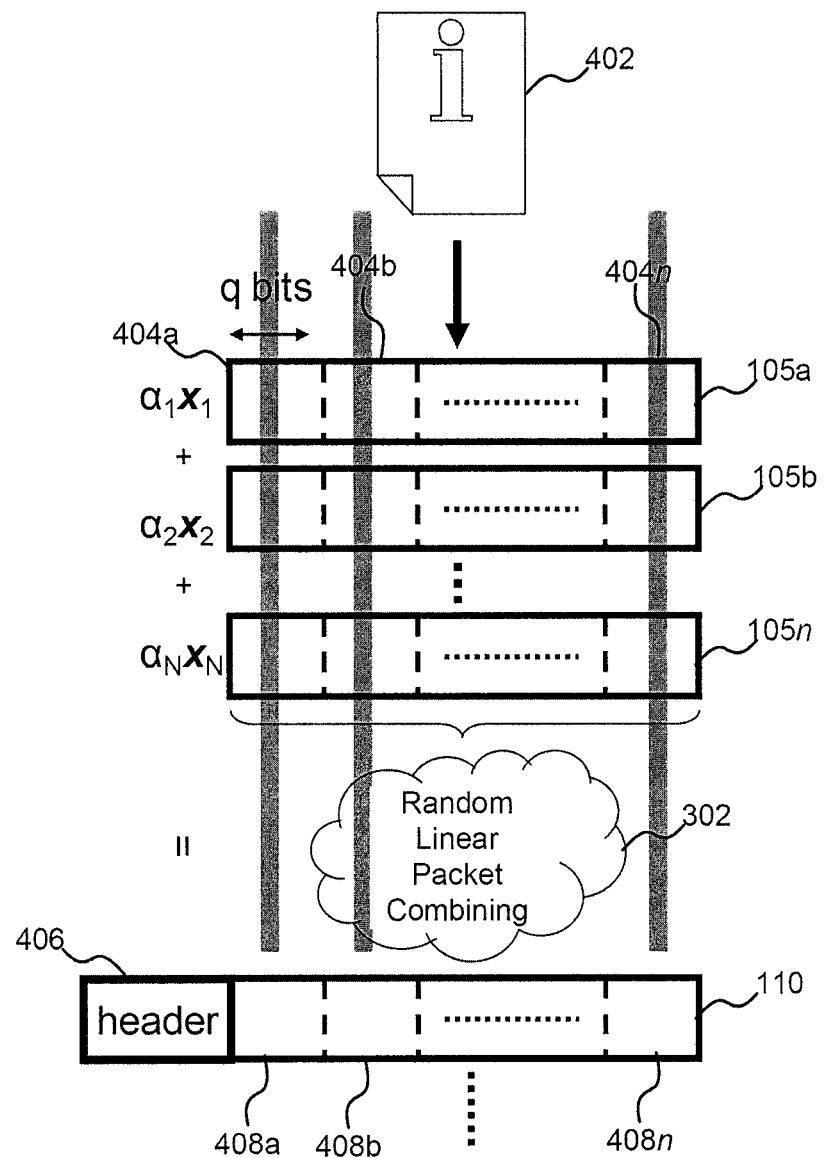

FIG. 4B illustrates that the blocks 404a-n of each data packet 105a-n may be arranged such that the blocks 404a-n can be combined linearly as illustrated in FIG. 4E. A random linear packet combining algorithm 302 may be applied to the data packets 105a-n to generate encoded data packets 108. For purposes of illustrating the process of random linear packet combining 302, the data packets 105a-n are labeled $x_1$-$x_n$.

FIG. 4C shows and embodiment of multiplying data packets 105a-n by a coding coefficient ($a_1$-$a_n$). In one embodiment, coding coefficients $a_1$-$a_n$ are random numbers. In a further embodiment, the random numbers are selected from a finite field of random numbers. In one embodiment, the random numbers may be selected from a Galois Field. One of ordinary skill in the art will recognize other suitable finite fields from which the random numbers may be selected.

In one embodiment, data packets 105a-n may be combined such that when receiver 204 receives the encrypted packet 108 it would be able to extract the original packets 105a-n. Accordingly, each encrypted packet 108 may be given a weight or signature and then receiver 204 may combine the weighted packets by a summation operation as described in equation 2. In one embodiment, the weights may be coefficients $a_1$-$a_n$. By changing coefficients $a_1$-$a_n$ the output of transmitter 202 changes. Receiver 204 may look at the outputs of the transmitter 202 and how it has been changed by changing the coefficients $a_1$-$a_n$. That helps receiver 204 to determine what data original packets 105a-n contained. Changing the coefficients may be arbitrary and in one embodiment they are random numbers. FIG. 4D illustrates how random linear packet combining 302 generates an encoded data packet 108. As illustrated, encoded data packet 108 may include a header field 406 and multiple data blocks 408a-n. Each of data blocks 408a-n may be q bits in length. In one embodiment, encoded data packet 108 may include the same number of data blocks 408a-n as each of the data packets 105a-n. Additionally, FIG. 4D illustrates how coding information is included in header field 406 of each encoded data packet 108. In one embodiment, the coefficients associated with each data packet 105a-n are included in header field 406 such that header field 406 includes all of the information needed for random linear packet extractor 214 to properly decode encoded data packet 108. The value of q may also be included in header field 406.

FIG. 4E illustrates how data blocks 408*a-n* of encoded data packet 108 are filled. Once each of the blocks 404*a-n* of data packets 105*a-n* are multiplied by encoding coefficients $a_1$-$a_n$ respectively, the data blocks 404*a-n* of each of data packets 105*a-n* are combined linearly into blocks 408*a-n* of encoded data packet 108. For example, the q bits of blocks 404*a* for each data packet 105*a-n* may be multiplied by coefficients $a_1$-$a_n$ respectively. Then, the product of the q bits for each of blocks 404*a* corresponding to data packets 105*a-n* and coefficients $a_1$-$a_n$ may be added together and included in first data block 408*a* of encoded data packet 108. Thus, encoded data packet 108 may include information about each of data packets 105*a-n*. Blocks 408*b-n* may similarly include data corresponding to blocks 404*b-n* of data packets 105*a-n* respectively. Accordingly, once a predetermined number of encoded data packets 108 have been received by receiver 204, random linear packet extractor 214 may decode the entire set of data packets 105*a-n* using the coding information included in header field 406 of each encoded packet 108.

Figure 5:
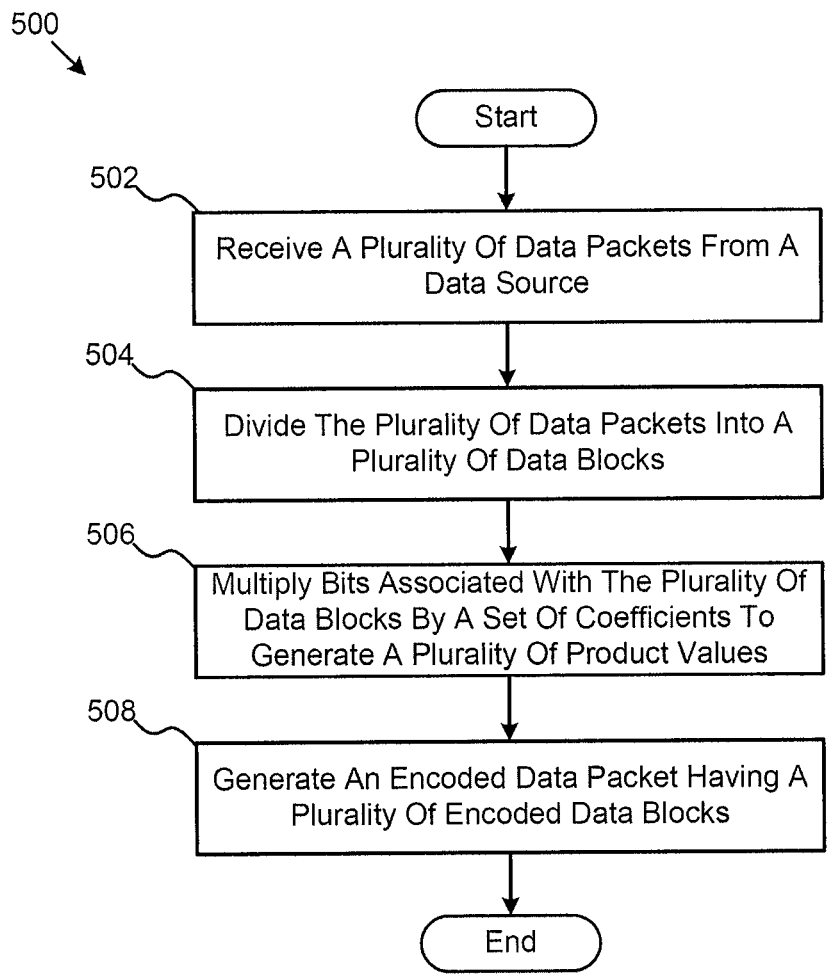
FIG. 5 is a schematic flowchart diagram illustrating one embodiment of a method for efficient broadcasting via random linear packet combining.

FIG. 5 is a schematic flowchart diagram illustrating one embodiment of a method 500 for efficient broadcasting using a random linear packet combining algorithm. At block 502, base station 102 may receive a plurality of data packets 105 from a data source. The data source may be a data storage device. Alternatively, the data source may be data server 104. In another embodiment, the data source may be a network connection to a remote device. Base station 102 may then divide the plurality of data packets 105*a-n* into a plurality of data blocks 404*a-n* as shown at block 504. Additionally, base station 102 may multiply bits associated with the plurality of data blocks 404*a-n* by a set of coefficients to generate a plurality of product values as described in block 506. In block 508, method 500 may also include generating an encoded data packet 108 having a plurality of encoded data blocks 408*a-n*.

Figure 6:
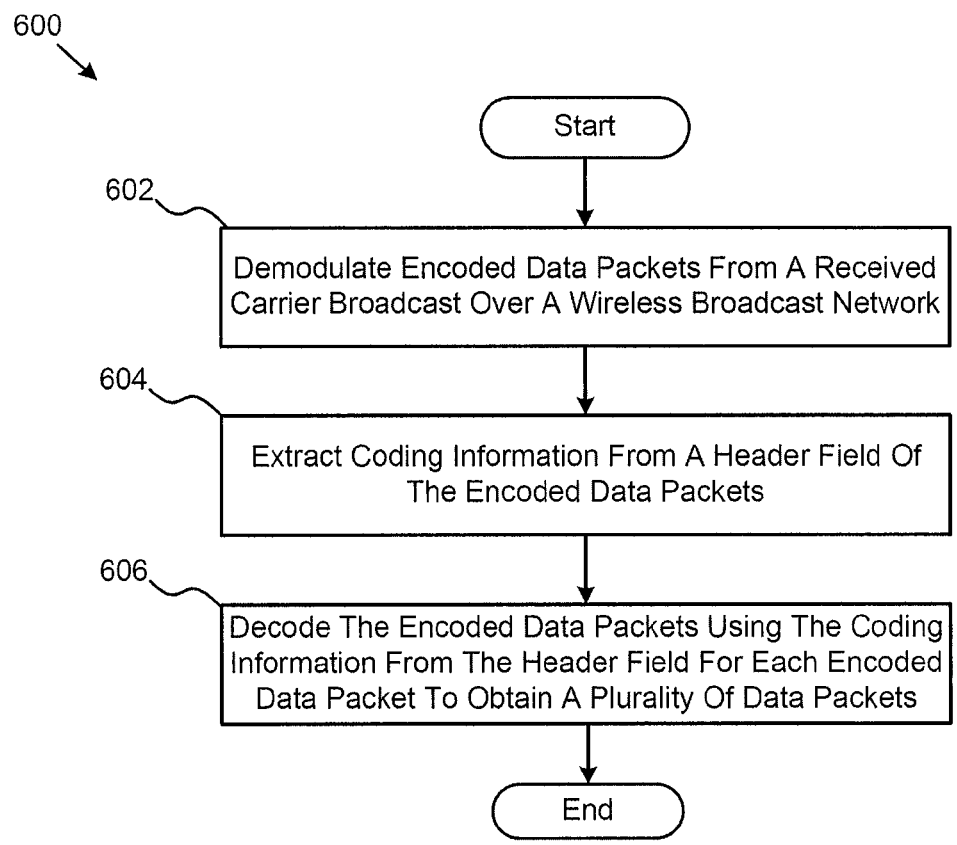
FIG. 6 is a schematic flowchart diagram illustrating one embodiment of a method for efficient broadcasting via random linear packet combining.

FIG. 6 is a schematic flowchart diagram illustrating one embodiment of a method 600 for extracting data packets from encoded data packets 108 received from a broadcast network at block 602. In embodiment, demodulator 212 may demodulate encoded data packets from a received carrier. The received carrier may be a wireless signal that had been previously broadcast over a wireless broadcast network by base station 102 according to method 500. Random linear packet extractor 214 may then extract coding information from a header field 406 of the encoded data packets 108 as illustrated in block 604. Then, at block 606, the random linear packet extractor 214 may decode the encoded data packets 108 using the coding information from the header field 406 for each encoded data packet 108 in order to obtain a the data packets 105 originally received by base station 102.

Figure 7:
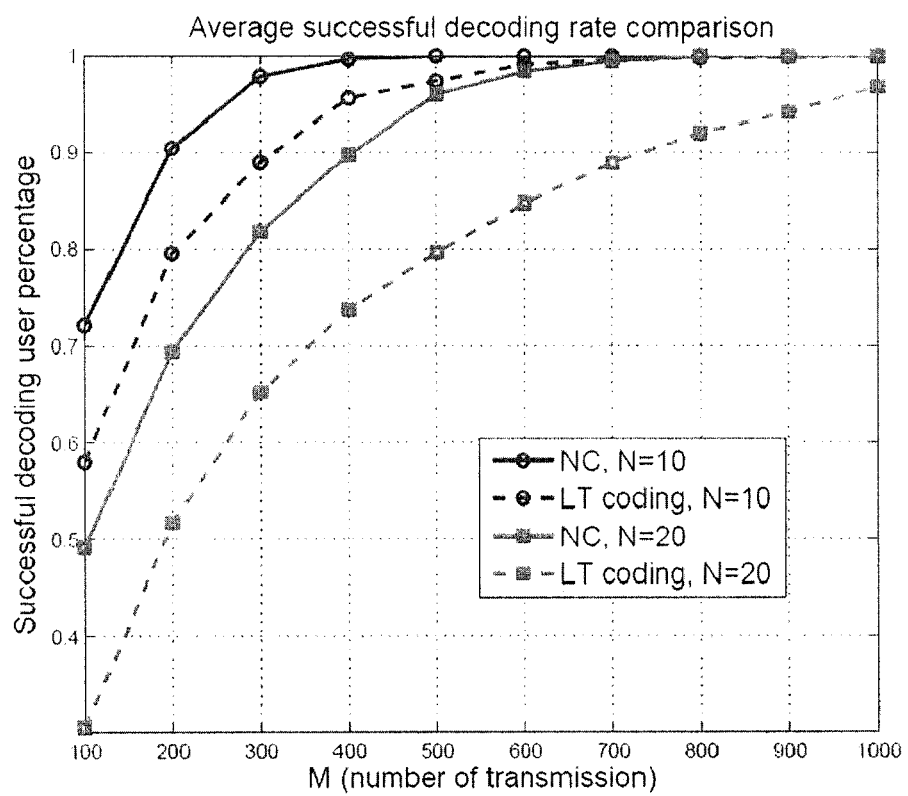
FIG. 7 is a graph chart diagram illustrating a comparison of an average successful decoding rate obtainable with LT coding and an embodiment of broadcast random linear packet combining.

FIG. 7 is a graph chart diagram illustrating a comparison of an average successful decoding rate obtainable with LT coding and an embodiment of random linear packet combining. As illustrated, random linear packet combining (NC) provides a significant improvement in average successful decoding rate as compared with LT coding. The results are significantly better, in both the case where ten encoded packets were transmitted and the case where twenty encoded packets were transmitted. Table 1 lists the system parameters used for the test that generated the results illustrated in FIG. 7.

TABLE 1

System parameters for comparison test of average successful decoding rate.

| Parameter | Symbol | Value |
| --- | --- | --- |
| Num of Info packect | N | 10/20 |
| Num of coded packect | M | 100-1000 |
| Coverage radius | D | 10 m |
| User density | ρ | 0.1 |
| Transmission power | P | 10 W |
| Channel mode | | Rayleigh fading |
| Path loss factor | α | 2 |
| rate factor for exp RVs | μ | 15 |
| Detection Thd | thd | 5 W |

Figure 8:
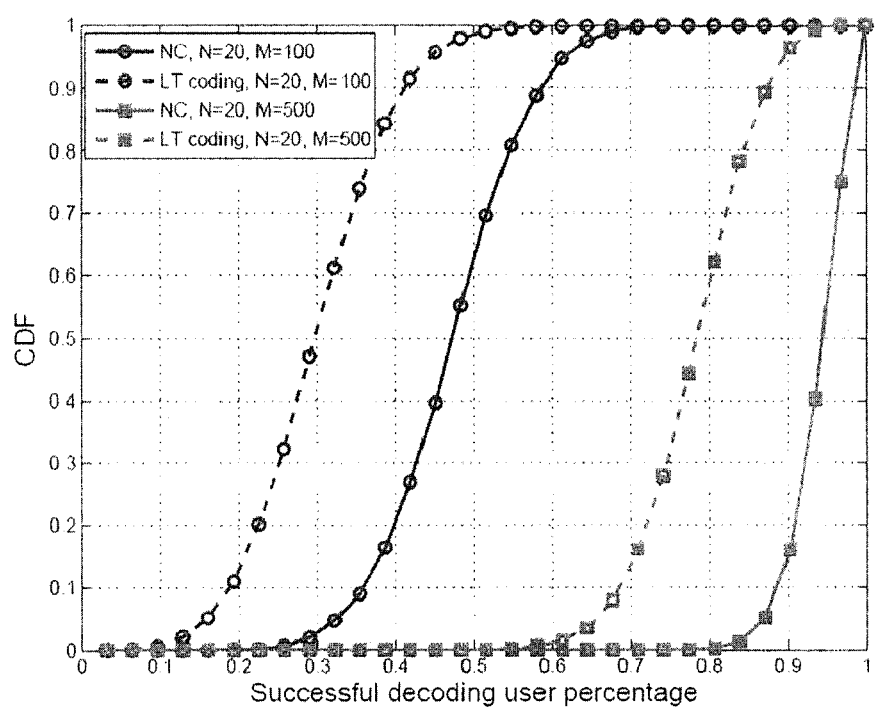
FIG. 8 is a graph chart diagram illustrating a comparison of probability of successful decoding user percentages obtainable with LT coding and an embodiment of broadcast random linear packet combining.

FIG. 8 is a graph chart diagram illustrating a comparison of successful decoding user percentages obtainable with LT coding and an embodiment of random linear packet combining. Similarly, the random linear packet combining method demonstrates significant improvements in performance over LT coding techniques. The system parameters used for the test of successful decoding user percentages are listed in Table 2.

TABLE 2

System parameters for comparison test of successful decoding user percentage.

| Parameter | Symbol | Value |
| --- | --- | --- |
| Num of Info packect | N | 20 |
| Num of coded packect | M | 100/500 |
| Coverage radius | D | 10 m |
| User density | ρ | 0.1 |
| Transmission power | P | 10 W |
| Channel mode | | Rayleigh fading |
| Path loss factor | α | 2 |
| rate factor for exp RVs | μ | 15 |
| Detection Thd | thd | 5 W |

The described embodiments provide several benefits over prior broadcast systems. Because the data broadcast by base station 102 is encoded, the effective broadcast range is increased as compared with broadcast systems that do not include data coding. Additionally, the random linear packet combining method provides better performance than typical coding techniques such as LT or Raptor fountain codes. For example, if the finite random number field selected in $F_u$ ($u=2^q$), then d(E) is less than or equal to $2^{-qE}$ as compared with $2^{-E}$ as in LT codes and Raptor codes. 7. Thus, as shown in FIGS. 6-7, with the same number of transmitted packets, the probability of decoding the full data set is higher with the present embodiments, than with LT codes. In other words, for the same decoding probability (QoS), fewer encoded packets 108 need to be transmitted when the present embodiments are employed. Thus, the benefits include lower power requirements at base station 102, lower bandwidth required to broadcast the same amount of data packets 105, and less delay broadcasting a complete file 402.

An additional benefit is that the coding scheme can be changed on the fly, and there is no need for base station 102 to inform broadcast network participants 110 of the change separately, because the coding information is included in header field 406 of each encoded packet 108.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for broadcasting coded data in a broadcast network comprising:
receiving a plurality of data packets from a data source;
dividing the plurality of data packets into a plurality of data blocks;
multiplying bits associated with the plurality of data blocks by a set of coefficients to generate a plurality of product values;
generating a predetermined plurality of encoded data packets, the predetermined plurality providing a redundancy of encoded data packets such that enough encoded data packets are generated to accurately decode the data in the encoded data packets, each encoded data packet in the plurality of encoded data packets having a plurality of encoded data blocks, wherein generating each encoded data packet in the plurality of encoded data packets comprises linearly combining the plurality of product values for respective data blocks of each of the plurality of data packets into corresponding encoded data blocks of each encoded data packet, said linearly combining the plurality of product values comprising:
adding a first product value associated with a first data block of a first data packet to a second product value associated with a first data block of a second data packet to calculate a first sum; and
assigning the first sum to a first data block of each encoded data packet.

2. The method of claim 1, further comprising multiplying the bits associated with each of the plurality of data packets with a different coefficient.

3. The method of claim 1, further comprising selecting a random number for each of the coefficients.

4. The method of claim 3, further comprising selecting the random numbers from a finite field of random numbers.

5. The method of claim 4, further comprising selecting the random numbers from a Galois Field.

6. The method of claim 1, wherein linearly combining the plurality of product values further comprises:
adding a third product value associated with a second data block of the first data packet to a fourth product value associated with a second data block of the second data packet to calculate a second sum; and
assigning the second sum to a second data block of each encoded data packet.

7. The method of claim 1, wherein each encoded data packet comprises a header field.

8. The method of claim 7, wherein the header field comprises the set of coefficients.

9. The method of claim 8, wherein the header field comprises a bit length value associated with the number of bits in each of the plurality of data blocks.

10. The method of claim 1, comprising broadcasting each encoded data in the plurality of encoded data packets over a wireless broadcast network.

11. A system for broadcasting coded data in a broadcast network comprising:
baseband equipment configured to receive a plurality of data packets from a data source;
a random linear packet combiner coupled to the baseband equipment, the random linear packet combiner configured to:
divide the plurality of data packets into a plurality of data blocks;
multiply bits associated with the plurality of data blocks by a set of coefficients to generate a plurality of product values;
generate a predetermined plurality of encoded data packets, the predetermined plurality providing a redundancy of encoded data packets such that enough encoded data packets are generated to accurately decode the data in the encoded data packets, each encoded data packet in the plurality of encoded data packets having a plurality of encoded data blocks, wherein generating each encoded data packet in the plurality of encoded data packets comprises linearly combining the plurality of product values for respective data blocks of each of the plurality of data packets into corresponding encoded data blocks of each encoded data packet; and
a modulator coupled to the random linear packet combiner and configured to modulate the plurality of encoded data packets onto a carrier for broadcast over a wireless broadcast network,
wherein the random linear packet combiner is further configured to add a first product value associated with a first data block of a first data packet to a second product value associated with a first data block of a second data packet to calculate a first sum, and assign the first sum to a first data block of each encoded data packet.

12. The system of claim 11, wherein the random linear packet combiner is configured to multiply the bits associated with each of the plurality of data packets by a different coefficient.

13. The system of claim 11, wherein the random linear packet combiner is configured to select a random number for each of the coefficients.

14. The system of claim 13, the random linear packet combiner further configured to select the random numbers from a finite field of random numbers.

15. The system of claim 14, the random linear packet combiner further configured to select the random numbers from a Galois Field.

16. The system of claim 11, the random linear packet combiner further configured to add a third product value associated with a second data block of the first data packet to a fourth product value associated with a second data block of the second data packet to calculate a second sum, and assign the second sum to a second data block of each encoded data packet.

17. The system of claim 11, wherein each encoded data packet comprises a header field.

18. The system of claim 17, wherein the header field comprises the set of coefficients.

19. The system of claim 18, wherein the header field comprises a bit length value associated with the number of bits in each of the plurality of data blocks.

20. A tangible non-transitory computer readable medium comprising processor-readable instructions that, when executed by a processing device, cause the processing device to perform operations for broadcasting coded data in a broadcast network, the operations comprising:
  receiving a plurality of data packets from a data source;
  dividing the plurality of data packets into a plurality of data blocks;
  multiplying bits associated with the plurality of data blocks by a set of coefficients to generate a plurality of product values; and
  generating a predetermined plurality of encoded data packets, the predetermined plurality providing a redundancy of encoded data packets such that enough encoded data packets are generated to accurately decode the data in the encoded data packets, each encoded data packet in the plurality of encoded data packets having a plurality of encoded data blocks, wherein generating each encoded data packet in the plurality of encoded data packets comprises linearly combining the plurality of product values for respective data blocks of each of the plurality of data packets into corresponding encoded data blocks of each encoded data packet, said linearly combining the plurality of product values comprising:
    adding a first product value associated with a first data block of a first data packet to a second product value associated with a first data block of a second data packet to calculate a first sum, said first data; and
    assigning the first sum to a first data block of each encoded data packet.

21. A system for extracting coded data in a broadcast network comprising:
  a demodulator configured to demodulate a predetermined plurality of encoded data packets from a received carrier broadcast over a wireless broadcast network, wherein the predetermined plurality of encoded data packets provides a redundancy of encoded data packets such that enough encoded data packets are demodulated to accurately decode the data in the encoded data packets;
  a random linear packet extractor coupled to the demodulator, the random linear packet extractor configured to:
    extract coding information from a header field of each encoded data packets in the predetermined plurality of encoded data packets; and
    decode the encoded data packets in the predetermined plurality of encoded data packets using the coding information from the header field for each encoded data packet to obtain a plurality of data packets.

* * * * *